(12) United States Patent
Yokell et al.

(10) Patent No.: US 6,507,870 B1
(45) Date of Patent: Jan. 14, 2003

(54) XDSL WEB ORDERING TOOL

(75) Inventors: Larry J. Yokell, Boulder, CO (US);
Lawrence Canavan, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 0 days.

(21) Appl. No.: 09/454,107

(22) Filed: Dec. 3, 1999

Related U.S. Application Data
(60) Provisional application No. 60/114,425, filed on Dec. 31, 1998.

(51) Int. Cl.$^7$ .............................................. G06F 13/00
(52) U.S. Cl. ...................................................... 709/225
(58) Field of Search ............................. 379/27.01, 1.04, 379/24, 30, 32.04; 324/533, 534; 370/248; 709/225

(56) References Cited

U.S. PATENT DOCUMENTS

| | | |
|---|---|---|
| 5,661,790 A | 8/1997 | Hsu |
| 5,774,870 A | 6/1998 | Storey |
| 5,796,953 A | 8/1998 | Zey |
| 5,917,817 A | 6/1999 | Dunn et al. |
| 5,991,543 A | 11/1999 | Amberg et al. |
| 6,002,671 A | 12/1999 | Kahkoska et al. |
| 6,023,502 A | 2/2000 | Bouanaka et al. |
| 6,031,904 A | 2/2000 | An et al. |
| 6,192,109 B1 | 2/2001 | Amrany et al. |

OTHER PUBLICATIONS

Makris, Joanna, Ticket To Hide?, Data Communications, Sep. 1998, pp. 50–65, vol. 27, No. 12.
Salamone, Salvatore, GTE Sets DSL Deployment—Broad–Based Rollout May Bring Service To As Many As 6 Million Lines, InternetWeek, Apr. 20, 1998, p. 8.
TTC's New T–BERD 109XC Offers Local Exchange Carriers Proactive Testing In A Mobile Computer, Business Wire, May 4, 1998.
Guy, Sandre, DSL Headway, Telephony, Feb. 9, 1998, pp. 22–32, vol. 234, No. 6.
International Search Report—May 23, 2000.
Guy, Sandra; "Test Product Takes Remote Monitoring To Next Level"; Telephony, Jun. 8, 1998, vol. 234 Issue 23, p. 26.

*Primary Examiner*—Robert B. Harrell
(74) *Attorney, Agent, or Firm*—Brooks & Kushman P.C.

(57) ABSTRACT

A system for providing a DSL service for a loop includes a web-based DSL ordering tool program to initiate a single session with a customer during which a loop qualification test is conducted and where the service order is placed. The web-based ordering tool is in communication with a web server to allow customer interaction.

17 Claims, 14 Drawing Sheets

Fig. 2

Order Status Steps:

1: Start
2: Select line
3: Verify
4: Order
5: Submit
6: Finish

Welcome to the MegaBit Online Order Form

Please select your preferred MegaBit Service type, contract terms, and Internet Service Provider from the following options. There may also be some MegaBit special offers available to you.

| MegaBit Service Pricing | Activation Charge | Month-to-Month | 12 Month Contract/mo | 36 Month Contract/mo | 60 Month Contract/mo |
|---|---|---|---|---|---|
| Megaline @ 256 Kbps | $110.00 | $40.00 | $40.00 | $40.00 | $40.00 |
| MegaOffice @ 512 Kbps | $110.00 | $65.00 | $62.40 | $59.80 | $57.20 |
| MegaBusiness @ 768 Kbps | $110.00 | $80.00 | $76.80 | $73.60 | $70.40 |
| Megaline @ 1 Mbps | $110.00 | $125.00 | $120.00 | $115.00 | $110.00 |
| Megaline @ 4/1 Mbps | $110.00 | $500.00 | $480.00 | $460.00 | $440.00 |
| Megaline @ 7/1 Mbps | $110.00 | $875.00 | $840.00 | $805.00 | $770.00 |

1. Please select MegaBit Service type:  - Select -

2. Please select MegaBit Service contract term*:  - Select -

* Cancellation charges may apply for early termination of contract.

3. Please select your preferred Internet Service Provider (ISP):
   - If you select an ISP other than U S WEST, you will need to contact that ISP to sign up for the specific package that is compatible with MegaBit Service.
   - What if I do not see my preferred ISP on this list? We are constantly adding to our list of MegaBit-ready ISPs. If you do not see your ISP on this list or would like to select an ISP not on the list, please call 1-888-MEGA-USW (M-F 7-10, Sat 8-5 MST) for information about ISPs that will be on this list soon or call your ISP to find out when they will be able to offer Internet Service with U S WEST MegaBit Service.

Internet Service Provider (ISP)   - Select -

*Fig. 4*

8. Do you have an installed 10BaseT Ethernet Network Interface Card (NIC)? - Select - ▼

In order to send you the correct MegaBit equipment, it is important that we know what equipment is connected to the line that will receive MegaBit Service. Please enter the correct numbers below:

How many wall mounted telephones? [0]

How many other telephone devices* including desk telephones, answering machines, FAX machines, computer modems, utility monitoring devices, DDSS satellite receivers, and burglar alarms? [0]

* Additional charges may apply if you have more than 1 wall mounted telephone or more than 3 other telephone devices.

9. please select your installation option:

| Install Method | ⦿ Self | ○ U S WEST |
|---|---|---|
| | Install and configure the MegaBit modem and NIC yourself. | A technician will be sent to your home or business to install and configure the necessary hardware. |
| Activation Fee* | $110.00 | $110.00 |
| Installation Charge* | Free | $149.95 |
| | There are numerous steps involved in the installation and configuration of your MegaBit equipment. Before you select this option, please review the steps involved. | We will contact you to schedule an appointment date and time. |

* Please note that special promotions and pricing discounts are not reflected in this table. All special promotions and pricing discounts will be applied at the time the order is issued.

10. So that we may better serve you in the future, please answer the following optional questions. This information will not be distributed outside of U S WEST.

Who is your computer manufacturer? - Select - ▼

What industry are you in? - Select - ▼

What applications will you be using with your MegaBit Service? - Select - ▼

How did you hear about U S WEST's MegaBit Service? - Select - ▼

What is your current modem speed? - Select - ▼

Fig. 6

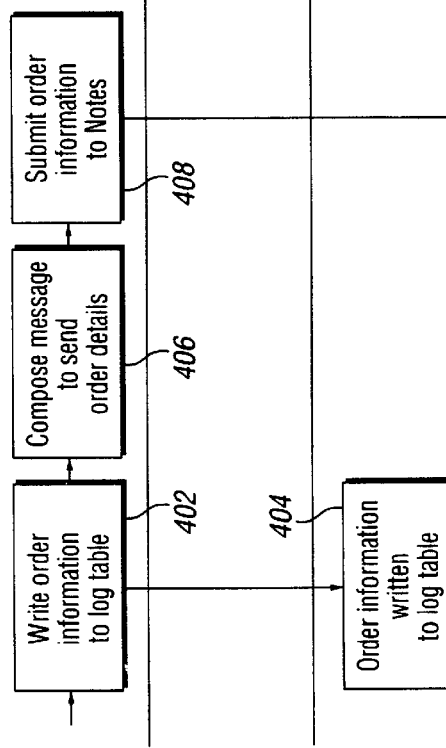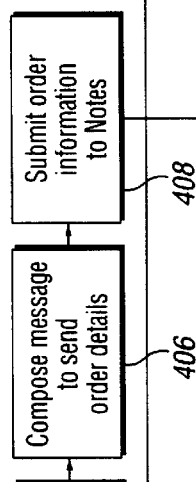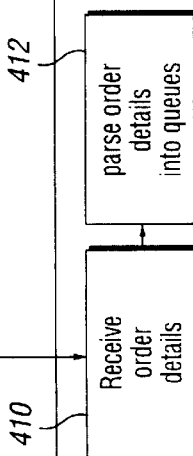
Fig. 12

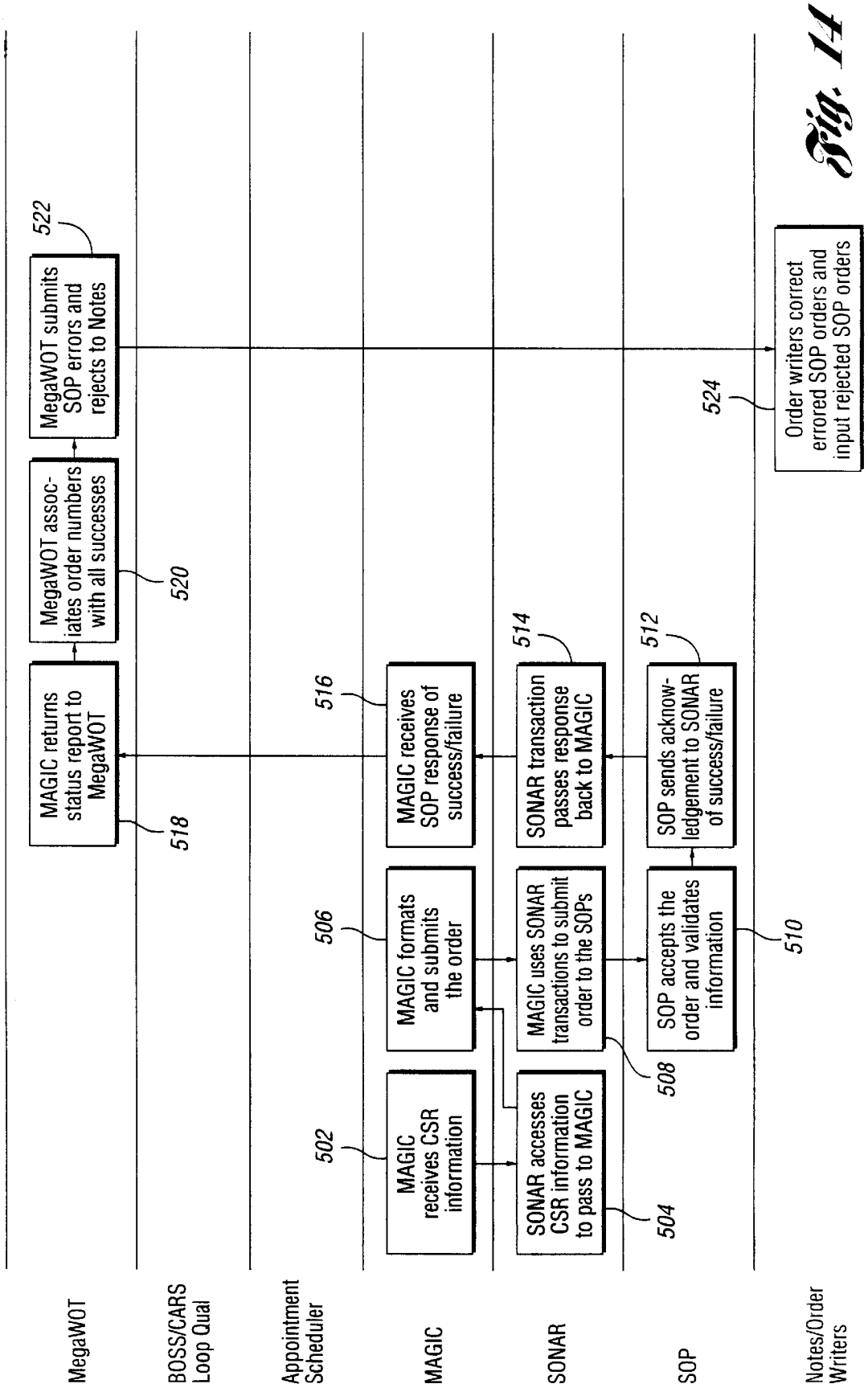

XDSL WEB ORDERING TOOL

CROSS-REFERENCE TO RELATED APPLICATIONS

This application claims the benefit of U.S. Provisional application Ser. No. 60/114,425, filed on Dec. 31, 1998 and entitled "xDSL Web Ordering Tool."

TECHNICAL FIELD

The present invention relates to a method for providing a digital subscriber line service for a loop.

BACKGROUND ART xDSL services, also commonly referred to as simply DSL or digital subscriber line services, are dependent on line conditions because DSL is implemented over twisted copper pairs. Further, there are many different flavors of digital subscriber line services, each providing service over different distances, and having different bandwidths. Some implementations for DSL are asymmetric, meaning that the downstream bandwidth is different than the upstream bandwidth. Other implementations for DSL services are symmetric. xDSL technologies provide extremely high bandwidth over an embedded twisted pair, copper loop.

Because DSL services have a strong dependence on line conditions, not all existing copper loops are qualified for DSL service. Previously, a customer would call his/her service provider and inquire as to whether or not the customer's loop supported DSL service. The customer service representative would perform a database look-up on the customer's line and evaluate their ability to receive service, or would send a technician out to the customer's location to test the line. Thereafter, if the line conditions were suitable for DSL service, a service technician would be sent to the customer's location to set up DSL on the customer end, and steps would also be taken on the provider end to support the new service. These multiple step processes for qualifying and getting DSL service are quite cumbersome and time consuming for the end user.

For the foregoing reasons, there is a need for an improved way for the customer to determine whether or not a local copper loop is qualified for DSL service, and obtain DSL service when the loop is qualified.

DISCLOSURE OF INVENTION

It is, therefore, an object of the present invention to provide a method for providing a digital subscriber line service for a loop. The method comprises initiating a session, conducting a loop qualification test, and placing a service order for the digital subscriber line service for the loop. The session is initiated through a web server, with a web-based digital subscriber line service ordering tool. The loop qualification test is conducted upon a request from the ordering tool. The service order is placed by the ordering tool and in accordance with the loop qualification test.

In preferred embodiments of the present invention, orders may be placed for new service or for changing an existing service. Further, in some embodiments, the method further comprises establishing a set of promotions applicable to service orders. Any promotions from the set of promotions that are applicable to the service order currently being placed are determined, and applied to the service order.

In some embodiments, the session is initiated by a customer and the method further comprises authenticating the customer prior to placing the service order. Authenticating preferably further comprises inputting authentication information to the ordering tool from the customer, and determining at least one customer service record corresponding to the authentication information. When the at least one customer service record includes a single live record, the authentication is performed based on the single live record.

In some embodiments, the method further comprises establishing a list of features that are incompatible with the digital subscriber line service, and identifying a list of features for the customer loop. A compatibility check is performed by comparing the identified features with the established list of features.

Further, in carrying out the present invention, a system for providing a digital subscriber line service for a loop is provided. The system comprises a web-based digital subscriber line ordering tool in communication with a web server. The ordering tool is programmed to initiate a single session with a customer during which a loop qualification test is conducted and a service order is placed.

In some embodiments, the system further comprises loop qualification logic configured to provide communication between the ordering tool and a loop qualification tool to perform the loop qualification test. In some embodiments, the system further comprises legacy logic configured to provide communication between the ordering tool and the at least one legacy system. Further, some embodiments further comprise a service order processor (SOP) in communication with the ordering tool via the legacy logic. Some embodiments further comprise a billing and order support system (BOSS) in communication with the ordering tool via the legacy logic. Further, some embodiments, further comprise a customer access and retrieval system (CARS) in communication with the ordering tool via the legacy logic. And further, in some embodiments, the ordering tool is configured to place service orders for new service, and further configured to place service orders for changing an existing service.

Still further, in carrying out the present invention, a system for providing a digital subscriber line service for a loop is provided. The system comprises a web-based digital subscriber line ordering tool in communication with a web server. The ordering tool is programmed to authenticate a customer, determine loop feature compatibility, determine loop qualification, and generate a service order. The customer is authenticated by comparing authentication information provided by the customer to authentication information received from a support system. The loop feature compatibility is based on existing features for the local loop. Loop qualification is based on a loop qualification test. Advantageously, the system determines loop qualification, and generates the service order in a single session.

The advantages associated with embodiments of the present invention are numerous. For example, method and systems of the present invention provide a web based ordering tool that allows customers to qualify their telephone line, and if qualified, order DSL services off of a web site. No existing system can qualify and order in one process. Embodiments of the present invention reduce time and cost by allowing the customer to qualify and order DSL service without having to contact a sales representative or customer service center. In existing systems, it is necessary for the customer to usually contact both a sales representative and a customer service center in a multiple step process for obtaining DSL service.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 2 is a screen shot of a session in accordance with the present invention;

FIG. 4 is another screen shot from the session;

FIG. 6 is still another screen shot from the session;

FIG. 12 is a web ordering tool process flow diagram;

FIG. 14 is a flow through process flow diagram.

BEST MODE FOR CARRYING OUT THE INVENTION

Figure 1:
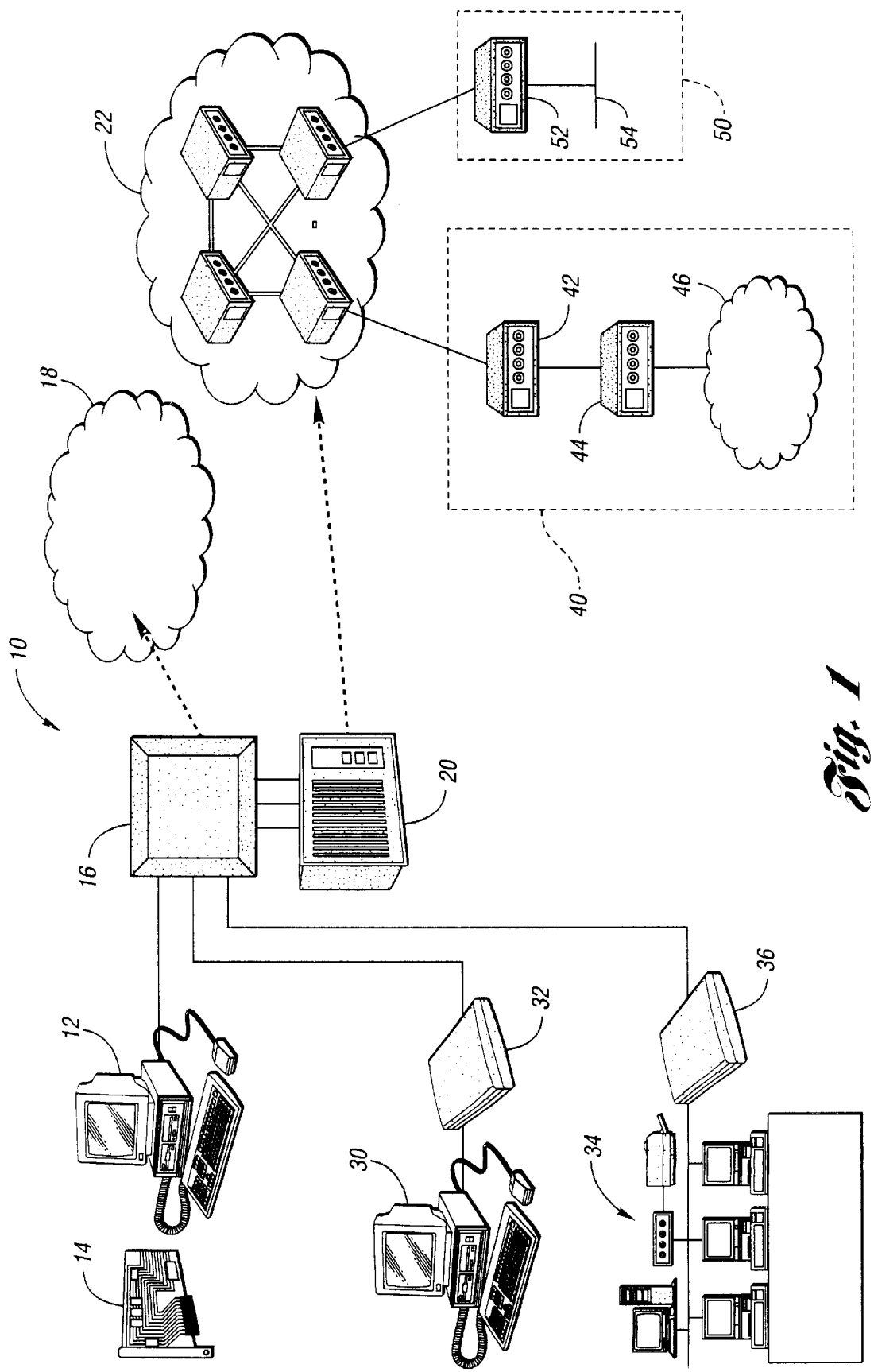
FIG. 1 is a networking environment of the present invention suited for use with the web ordering tool of the present invention.

MegaBit Services are a family of managed services delivered to a subscriber location on Digital Subscriber Line (DSL) technology. MegaBit Services provide end to end connectivity for simultaneous high-speed data and voice transmissions over a dedicated transport architecture. The service uses Rate Adaptive DSL (RADSL) technology for subscriber end service delivery, and asynchronous transfer mode (ATM) for host end connectivity. MegaBit Services, based on DSL technology, use an existing phone line to transmit data signals as well as analog voice signals. Of course, other flavors of xDSL may be used for subscriber end service delivery and other techniques may be used for host end connectivity.

MegaBit Services are suitably based on a "hub and spoke" model. The "hub" in this model corresponds to the host location - either a corporate LAN or an Internet Service Provider (ISP). The hub location uses one of the hub options, and in a suitable embodiment, the hub options are called MegaCentral product offerings. The "spoke" corresponds to subscribers who need access to the host network or resources. Each subscriber (spoke) should be connected to a host (hub) location. The subscriber chooses one of the spoke options, and in a suitable embodiment, the spoke options are called MegaSubscriber options. Of course, it is appreciated that certain terminology is used herein for convenience in reference, and that such terms are to be broadly interpreted.

The MegaSubscriber options are:

MegaBit 256 Select/Deluxe: 256 Kbps access to a corporate LAN or ISP, roughly 9 times the speed of a 28.8 Kbps modem; Select uses modem pooling, while Deluxe provides always-on service.

MegaOffice: Those subscribers with greater bandwidth needs can select this option, which provides 512 Kbps access.

MegaBusiness: Heavier-use business customers and serious cyber-surfers needing more bandwidth and video capability can select this option, which provides 768 Kbps access.

MegaBit: For intensive business users, this selection offers three high-speed options: 1 Mbps downstream/1 Mbps upstream access; 4 Mbps downstream/1 Mbps upstream access; and 7 Mbps downstream/1 Mbps upstream access.

The MegaCentral options for the host (hub) locations suitably are speeds of 1.5 Mbps or 3–45 Mbps in 3 Mbps increments. For fast paced access to the Internet using DSL technology, MegaPak is an Internet solution coupled with MegaBit services. MegaPak provides a continuous 256 Kbps digital connection to the Internet. MegaBit gives the subscriber a very fast Internet connection that's also secure and reliable. And because MegaBit is a continuous digital line, a subscriber never has to log on or manually dial in (in Deluxe implementations).

The present invention is a web ordering tool, and in a suitable implementation, the web ordering tool is termed MegaWOT. Preferred embodiments include remote video service representative linkage for service selection and loop qualification for xDSL MegaBIT Services. Of course, the MegaWOT implementation described herein is an embodiment preferred by the inventors, and the present invention defines and encompasses other variations for a web ordering tool. Further, the following continued description of the present invention provide details for the MegaWOT implementation, and it is appreciated that the invention may be implemented in other ways.

The present invention provides web-based software developed to allow customers and channel partners to self qualify and on-line order via a web page to determine whether they can receive high speed xDSL services to their home or business. Preferred implementations of the present invention also allow customers to dynamically bridge with a live service representative remotely to help them through the ordering process, if required.

The software of the present invention reduces the overall time and costs to order the xDSL MegaBIT Service and provides a mechanism to allow customers to directly order services without requiring manual or live service representative contact. Of course, the software could be applied to any flavor of DSL service, in accordance with the present invention. The software (preferably) allows for on-line demonstrations or customer service via a live xDSL link over the network to a remotely located service representative. The system of the present invention uses a faster, cheaper, and on-demand or virtual sales channel rather than existing sales channels, and allows for more efficient and continuous ("always on") access anywhere in the world.

MegaWOT has the ability to display the final price of the customer's package including promotional price discounts to the customer before they submit the order (when the DSL provider's ISP is selected, for example, USWEST.net). The total package price is displayed to the customer after they have completed the order form, but before they submit their order. Customers view the total cost of their order on the review order page along with the order information. Two types of pricing are considered here, list pricing and promotional pricing. List pricing consists of the regular list item prices for each of the components of MegaBit Service. Promotional pricing includes any discounts on service, equipment, non-MegaBit related free items, etc.

Pricing is itemized with the total list price of the customer's package calculated first then any discounts are itemized and applied against the cost of the package. MegaWOT calculates the new price less the discounts applied. Non-recurring and recurring charges are displayed separately. For promotions that require calculation beyond those specific operations outlined below, the promotion is listed as a separate line item but is not calculated as a discount from list price. Of course, the details of MegaWOT described above and below are in a suitable implementation that has been designed by the inventors. Changes may be made to MegaWOT and other web ordering tools of the present invention may or may not share the same details. Further, some terms used above and below are associated with the MegaWOT implementation (for example, MegaBit, etc.) and these terms are not meant to limit possible variations of MegaWOT in accordance with the present invention. Further, such terms are not meant to imply that other implementations of the invention need such specific components. Accordingly, the broader summary of the invention given before the MegaWOT description defines the invention without using such terms.

Four distinct types of orders are outlined here. This depends upon whether a customer places an order for new MegaBit Service or a change order on existing MegaBit Service. The four types are:

1. New MegaBit order, all systems up.
2. New MegaBit order, systems down.
3. Change existing service, all systems up.
4. Change existing service, systems down.

Business Rules (for the MegaWOT implementation):

1. Prices should be itemized.
2. Prices should be displayed in a table format.
3. List pricing items should be displayed in a separate section from promotional prices.
4. Recurring and Non-recurring charges should be displayed separately.
5. Change orders do not vary by market segment and do not calculate promotional price.
6. On the back end, order writers are not given pricing information. They should receive the promo code if one was entered.
7. There are no special rules that apply to the former MegaPak service offering.
8. A customer may receive multiple promotions on a single order.
9. Customer is allowed to enter only one promo code.
10. There is only one change fee per change order even if a customer changes both speed and MegaCentral.

Promotional pricing line items may be displayed one of two ways: in the exemplary implementation a line item with a description and corresponding negative dollar amount OR as a line item with a description only. These types of operations and when each is used are described below.

Operations that will be calculated with negative dollar amount include the following:

1. Free non-recurring charge promotions (free installation, free modem, etc.).
2. Flat rate discount on recurring charges (e.g. five dollars per month off MegaBit charge).
3. Percentage discount on recurring charges (e.g. 20% discount per month off MegaBit charge).
4. Flat rate refund ($100 off of new MegaBit order).

Operations that are described as a line item but are not assigned a negative dollar amount include the following:

1. Free non-MegaBit equipment.
2. Any additional non-MegaWOT related offers (e.g. special discounts, etc.).
3. All other special promotions not explicitly included below.

Exemplary Flow of Events:

A. Customer orders new MegaBit Service; BOSS/CARS up.

1. Customer chooses the order New MegaBit Service option.
2. Customer inputs authentication information.
3. MegaWOT authenticates and loop qualifies the customer.
4. Customer continues with order form.
5. Customer completes order form inputting the optional promo code, if desired.
6. Customer selects to continue to review order information.
7. Total package pricing is displayed to customer on the bottom of the same page for review.
   a. Pricing should be (but not required) itemized according to the rules indicated below.
   b. Pricing information should be displayed in a table format.
   c. Pricing should first calculate list pricing and then calculate the special promotion or discount as a reduction in list price.
   d. Recurring and non-recurring charges should be displayed separately.
8. Customer selects Submit to complete the order.
9. Order is processed normally in Lotus Notes or any other suitable system.

Secondary Flow of Events:

B. Customer orders new MegaBit Service; BOSS/CARS down.

1. Customer chooses the order new MegaBit Service option.
2. Customer inputs authentication information.
3. Customer receives BOSS/CARS down notice.
4. (Optional: The inventors prefer not to ask the customer about market segment, but some embodiments of the invention may do so. As such, it is to be understood that other references herein to asking about market segment are also optional. As a preferred alternative to asking about market segment, all customers may be shown information for all market segments.) Customer is asked on the same page to indicate market segment (for example, business or residential) and to input the number that they would like to qualify for MegaBit Service.
5. On the next screen the Special Promotions menu link should become active.
6. Customer is loop qualified.
7. Customer completes order form including optional promotion code.
8. Customer selects to continue to review their order information.
9. Total package pricing is displayed to customer on the bottom of the same page for review information.
10. Customer selects Submit to complete the order.
11. When batch update runs, total package price does not need to be calculated but a flag needs to be set if the customer's market segment does not match his reported market segment (because BOSS/CARS was down)
12. If the market segments differ, the order should be sent to the Needs Customer Contact—Other queue with a remark about the discrepancy. Otherwise, the order should be processed normally.

C. Customer changes existing MegaBit Service; BOSS/CARS up.
1. Customer chooses the Change Existing Service option.
2. Customer inputs authentication information.
3. Customer is authenticated and loop qualified.
4. Customer completes abbreviated order form (no promo code field).
5. Customer selects continue to review their order information.
6. Total package pricing is displayed to customer at the bottom of the same page for review.
   a. Pricing should be itemized according to the rules listed below.
   b. Pricing should be displayed in table format.
   c. Change order fee should always be displayed as a line item.
   d. Recurring and non-recurring charges should be displayed separately.
   e. Note: There may be no calculation of promotional pricing for these orders.
7. Customer selects submit to submit order.
8. Order sent to Notes (that is, the term Notes as used herein means, Lotus Notes or an essentially equivalent system) in the Ready to Type—Change Service queue.

D. Customer changes existing MegaBit Service; BOSS/CARS down.
1. Customer chooses the Change Existing Service option.
2. Customer inputs authentication information.
3. Customer receives BOSS/CARS Down notice—Customer is not asked for market segment.
4. Customer is loop qualified.
5. Customer completes abbreviated order form (no promo code field).
6. Customer selects continue to review their order information.
7. Total package pricing is displayed to customer at the bottom of the same page for review.
   a. Pricing should be itemized according to the rules listed below.
   b. Pricing should be displayed in table format.
   c. Change order fee should always be displayed as a line item.
   d. Recurring and non-recurring charges should be displayed separately.
   e. Note: There may be no calculation of promotional pricing for these orders.
8. Customer selects submit to submit order.
9. Order sent to Notes in the Needs Customer Contact—Change Service queue.

Input/Output Tables
The following are line items that should be displayed in list pricing for new MegaBit Service orders in a preferred implementation:

| Parameter | Detail | Recurring | Non-Recurring/One-Time Discount |
|---|---|---|---|
| Speed Ordered/Contract Term | The MegaBit speed a customer orders and duration of the MegaBit contract | Y | Y |
| Internet Access Package | (displayed when DSL provider's ISP is selected by the customer) | Y | Y |
| Microfilters required | MegaWOT will have to calculate the number of microfilter packages required based upon the customer's response to the number of telephone devices. | N | Y |
| Equipment | Modem with NIC | N | Y |
| Installation Option | Self or Tech | N | Y |

The following are line items that should be displayed in list pricing for change existing MegaBit Service orders in a preferred implementation:

| Parameter | Detail | Recurring | Non-Recurring/One-Time Discount |
|---|---|---|---|
| Speed Ordered/Contract Term | The MegaBit speed a customer orders and duration of the MegaBit contract | Y | Y |
| Internet Access Package | The recurring charge will change when the customer changes speed; this service is optional | Y | Y |
| Change Fee | A single change fee associated with all change orders. This description should have a large * after the description of the charge. Beneath the table there should be an * with a comment indicating which states are exempt. | N | Y |

Promotions may be dependent upon a customer's response to any of the following parameters:

| | |
|---|---|
| Speed Ordered | The MegaBit speed a customer orders |
| Contract Term | The duration of the MegaBit contract |
| Internet Access Package | Will appear only if customer selects DSL provider's ISP service |
| Installation Option | Self or Tech |
| Market Unit | Consumer or Small Business |
| State | This will determine whether a given promotion or price discount has been approved by the PUC in that state. Special Promotions will only become valid in a state once they have been approved for that state |
| Promotion Code (New Field) | The promotion code is a code that the customer will enter free form on the order form. This will need to be stored and will need also to appear as a new field in the Notes output. |

Example showing the total cost of MegaBit service:

| Item | Non-recurring | Monthly |
| --- | --- | --- |
| MegaBit @ 256 Kbps for 1 Year | 110 | 40 |
| Internet Access | 25 | 19 |
| Technician Installation | 149.99 | |
| MegaBit modem | 249 | |
| Extra packages Microfilters | 40 | |
| TOTAL LIST PRICE: | 499.99 | 59 |
| Special Discount Savings | Non-recurring | Recurring |
| Free modem | −249 | |
| Free Super Phone for Consumer Customers (a $149 value) | | |
| TOTAL DISCOUNT SAVINGS: | −249 | |
| TOTAL COST OF MEGABIT ORDER: | 259.99 | 59 |

It is to be appreciated that, as alluded to above, the DSL provider may also offer ISP service. This allows a customer to obtain DSL service and ISP service from the same provider, if desired. Alternatively, a customer may obtain DSL service from someone else. Herein, USWEST.net is used as an example of a DSL provider that is also an ISP. It is appreciated that references to USWEST.net in the description are not meant to be a limiting example. Accordingly, where USWEST.net is used as an example, it is appreciated that the present invention readily applies to other DSL providers that also provide ISP service.

Additional MegaWOT and Notes Details (for a Preferred Implementation)

Market Segment (Optional—not in the presently preferred implementation)

1. If BOSS/CARS is down, the customer will need to be asked on the greet page for their market segment—either business or residential. This value will need to be stored separate from the market segment received from BOSS/CARS when batch update is run. This will need to include text and potentially help to indicate why it is important to indicate market segment correctly and to help home office customers identify the correct market segment.
2. Once a customer answers this market segment question, he should be able to access the Special Promotions page for the market segment he has reported. Of course, other embodiments simply show all promotions to everyone.
3. In cases where BOSS/CARS is down, if the customer reports a different market segment than the market segment they selected on the order form, this should be flagged when an order writer received the order in the Notes database. This should appear as one of the errors highlighted in red (in the same way as customer ordered a higher speed of MegaBit service than is eligible to them). Orders where this occurs should be displayed in the Needs Customer Contact—Other queue.

MegaWOT USOC

1. For customers changing speed who have the DSL provider as an ISP and are not changing ISPs, MegaWOT needs to be able to display the correct recurring charge (based upon the Internet access package and the new speed).
2. MegaWOT needs to calculate the new USOC and put this on the order that is sent to Notes.

Promo Code

1. The promotion code should be a free form entry field (10 character alphanumeric). This code should be stored in the log table and displayed in the review order form.
2. The promotion code should be displayed to the order writer. The order writer will need Methods & Procedures documentation created to know how to translate each promo code into the required USOCs.
3. Promo codes are not required for all promotions, only those explicitly related to the promo code.

Microfilter

1. The application will need to calculate the number of additional Microfilter packages beyond the single free one that a customer receives. The rules for performing this calculation are included below:
    a. Each microfilter package contains 3 in-line or baseboard microfilters and 1 wall mounted.
    b. Customers receive 1 free package of microfilters.
    c. Additional packages could be charged per package.
    d. The number of packages required should be based upon the number of devices the customer reports to be attached to his phone line.
2. IF POSSIBLE, the number of microfilters packages for which the customer will be billed should be displayed in Notes. Notes already can calculate the USOC, the number of packages in excess of 1 should also be displayed.

Special Promotions Maintenance Tool

The Special Promotions Maintenance Tool allows the designated maintenance resource to quickly and easily add, change, or delete individual special promotions. The tool is an Intranet application with secured access. The tool consists of the following processes:

1. Add Promotion.
2. Modify Promotion.
3. Delete Promotion.

Add Promotion

The following functionality is built into the Add Promotion process:

| Screen | Purpose | Appearance |
| --- | --- | --- |
| Select Option screen | Maintainer selects whether to add, modify, or delete a special promotion | Three buttons:<br>-Add Promotion<br>-Change Promotion<br>-Delete Promotion |
| Promotion Identification screen | Enter basic information about the promotion. | Enter:<br>-Name of Promotion<br>-Promotion Code (This is a code that should be entered into the SOP in order for the order to go through. It does not have to be entered by the customer unless the Promo Code required option is set to yes.)<br>-Promotion Start Date<br>-Promotion End Date |
| Define Promotion Criteria screen | Identify eligibility requirements for all choices in the set of defined parameters. Each option for each parameter will be displayed separately with its own check box. All options that ARE eligible should be checked. | Parameters include:<br>-Promo code required (check if yes)<br>-Market Segment (Consumer or Business)<br>-State<br>-MegaBit Speeds (all)<br>-Contract Term (all)<br>-Internet Access Package<br>-Install Option (self or tech) |
| MegaBit Discounts | This describes discounts on MegaBit service and/or Internet Access. Discounts may be for recurring or non- | Categories include:<br>-MegaBit Service<br>-Internet Access (When ISP is same as DSL |

-continued

| Screen | Purpose | Appearance |
|---|---|---|
| | recurring charges. Discounts may be flat amounts or may be percentages. | provider) Fields include: -Description Field (this is the description that will be displayed to the customer) -Recurring Discount Amount (enter a numeric value) -Percent indicator (Indicates whether numeric value entered is a percent) -Non-recurring Discount Amount (enter a numeric value) -Percent indicator (Indicates whether numeric value is a percent) |
| Line Item Discounts | This page describes MegaBit related non-recurring charges associated with new MegaBit orders. All MegaBit items in the Pricing table will be displayed with their corresponding USOCs, Description, and Cost. Each of these records will have an associated discount option. This option will be filled in when a discount is to be applied to one of these items and will be left blank if no discounts applies to a particular item. | Fields include: -USOC (all from pricing table) -Description (all from pricing table) -Cost (all from pricing table) -Promo Description (if there is a promotion for this item, line is filled in with what should be displayed to the customer) -Discount (if there is a promotion for this item, line is filled in with discount numeric value) |
| Free Items and Give-aways screen | This page describes free items and discounts that may be offered as part of a promotion but are not items directly associated with MegaBit. Example might include giving away a free phone with new MegaBit Service. These lines are blank unless filled in as part of a promotion | Fields include: -USOC (if the free item or promotion has a USOC associated with it) -VEI code (code associated with free phones) -Description (short description of the item) -Promo Description (description of the promotion that should be displayed to the customer) -Discount (amount of discount if applicable-not to be used for free items. This should be a numeric field) |

Modify Promotion

1. Once an administrator selects modify promotion, he/she will receive a list of all promotions described in the promo table—current, future, past promotions. This includes the name, promo code, start and end dates.
2. Administrator selects the promotion to modify.
3. The same screens as for add promotion will be brought back, pre-populated with the original data for the promotion to be modified.
4. The administrator then makes the changes required.
5. The administrator saves these changes to the promotion.
6. The promotion records in the database will be overwritten.

Delete Promotion

1. Once an administrator selects delete promotion, he/she will receive a list of all promotions described in the promo table—current, future, past promotions. This includes the name, promo code, start and end dates.
2. Administrator selects promotion to delete.
3. Administrator chooses to delete promotion.
4. The tool should prompt the administrator to be certain that he wants to delete this promotion.
5. If the administrator chooses to continue, the record will be deleted from the database.

Enabling Handing of Duplicate CSRs

MegaWOT allows customer authentication where duplicate CSRs exist in BOSS/CARS. There are multiple types of duplicate records that may exist in BOSS/CARS. When Telephone Numbers are disconnected, aged, then re-provisioned, both the current "Live" account and the disconnected "Final" account remain in the BOSS/CARS system. MegaWOT will always return only "Live" accounts (in preferred embodiments).

When multiple records exist for a single number but only one of these accounts has a status of "Live", MegaWOT is able to retrieve all accounts that correspond to the phone number. MegaWOT is then able to select the "Live" account and perform authentication on that account only.

In cases where there are multiple "Live" accounts that correspond to a single telephone number, MegaWOT returns the existing CSR Not Found response. While it is technically possible that MegaWOT could distinguish between these accounts, the potential for error and the complexity of the business rules make it a non-preferred option. Duplicate "Accounts" can exist in the following situations: (1) Errors in BOSS/CARS where one account is a valid "Live" account and there is an error on the other account, (2) A customer has an account that is billed under a non-working telephone number (TN). In this case one TN is a working TN and the other is strictly a billing TN, (3) A customer has changed locations and currently has two live working accounts with the same SSN but different Customer Codes. Please note that this is not a comprehensive list of the possible duplicate cases.

Because duplicate "Live" accounts are always special cases and in some cases it will not be possible to distinguish a working live account from a to-be-disconnected account, MegaWOT should not attempt to authenticate in cases where there are duplicate "Live" accounts.

Business Rules in the MegaWOT implementation

1. Return only Live accounts.
2. Do not return any accounts in cases where there are more than one Live account.
3. In cases where duplicate CSRs exist, MegaWOT should be able to authenticate either on Customer Code or the last four digits of the SSN.

Exemplary Flow of Events

1. Customer inputs authentication information.
2. MegaWOT makes call to retrieve customer service record.
3. In cases where there is only one account associated with the TN, MegaWOT should check that the account status is a valid "Live" status. Note: This check should be performed prior to COS incompatible check and prior to authentication.
4. In cases where there are two customer service records corresponding to the same billing TN or BTN, MegaWOT should search for the presence of an account with a status of "Live". Note: This check should be performed prior to COS incompatible check and prior to authentication.
5. If there is one account with a "Live" status, MegaWOT should perform the COS Incompatible check and Authentication on the "Live" account only.

6. If there is more than one account with a "Live" status, MegaWOT should return the existing CSR Not Found message.
7. \*\*\*Please note that the only valid status is "Live". Any other status should not be allowed to order.\*\*\*

Input/Output Tables

| Scenario | Response |
| --- | --- |
| There is only one account associated with a given BTN and account has "Live" status | MegaWOT retrieve the Customer Service Record and performs authentication and COS incompatible check. |
| There are multiple accounts associated with the BTN, but only one has "Live" status | MegaWOT retrieves the Customer Service Record for the "Live" account and performs authentication and COS incompatible check. |
| There is only one account associated with a given BTN and account has a status other than "Live" | MegaWOT returns the existing CSR Not Found response. |
| There are multiple accounts associated with the BTN, but none has a "Live" status | MegaWOT returns the existing CSR Not Found response. |
| There are multiple accounts associated with the BTN, and more than one has a "Live" status | MegaWOT returns the existing CSR Not Found response. |

Check Account for Incompatible Features

MegaWOT has the ability to retrieve a list of features on the telephone line and compare these against a list of features that are known to conflict with MegaBit service. Features such as certain alarming and call forwarding features may be incompatible with MegaBit service. MegaWOT needs to be able to identify these customers and inform them that they need to call in to place their orders. Without this functionality, the risk exists for accepting an order from a customer whose line does not qualify.

The class of service check should be performed prior to the feature check. The feature check will retrieve all of the line USOCs on a given line. MegaWOT will then check this list against the list of incompatible line features contained in the features table. If any of these USOCs appear on the line, the customer will receive the existing incompatible class of service message. If none of these USOCs appear, the customer will be allowed to continue.

Business Rules (for the MegaWOT implementation)

1. Customers whose accounts have incompatible features should not be allowed to place an order through Mega-WOT. (In the alternative, the customer may be given the option of changing/terminating the incompatible features, as appropriate).

Exemplary Flow of Events

1. MegaWOT performs customer authentication check.
2. MegaWOT performs the Class of Service Check.
3. MegaWOT performs the feature compatibility check.
   a. MegaWOT identifies the line USOCs for a given line.
   b. MegaWOT compares these USOCs against the Features table.
4. If incompatible USOCs are located, the customer receives the existing incompatible feature message and is not allowed to order. Otherwise, the qualification process continues with loop qualification.

Input/Output Cases

| Scenario | Response |
| --- | --- |
| Incompatible line USOCs are found | Customer receives existing Incompatible Feature message |
| Incompatible line USOCs are not found | MegaWOT continues qualification process with loop qualification |

Notify MegaCentrals About New MegaBit Customers

MegaWOT may also be used to inform MegaCentrals that they have a new customer. This notification should take place roughly within 48 hours of the customer contact.

Allow Customers to Change Speed/MegaCentral

MegaWOT allows customers to order new MegaBit service on an existing POTS line and will allow existing MegaBit customers to change MegaBit service speed or change MegaCentral. There will be at least two types of service orders that will be accepted by MegaWOT. Each of these new orders will be associated with a distinct process flow. The two order types are "order new MegaBit Service orders and change existing MegaBit Service orders."

Customers will be allowed to change speed and change MegaCentral in the same order. All customers selecting to change existing service will be authenticated and loop qualified. In addition, MegaWOT will check the line to determine whether or not the customer has MegaBit Service on their line.

Customers will be asked to log in using the line that they would like to change. This eliminates an additional step for the customer (e.g. having to select which line to attempt to qualify). The reason for allowing customers to select a line after authentication is to allow the customer to loop qualify multiple lines on their account in the event that some qualify and some do not. Presumably existing MegaBit customers know which line currently receives MegaBit and which line they are proposing to change and will not need to complete an additional step in order to determine this.

Once a customer inputs his authentication information, MegaWOT can perform all authentication and qualification functions without requiring user input. This means that following the authentication screen, MegaWOT can send the customer directly to the order form.

In general, MegaWOT will not be handling contract term issues. Customers will only be allowed to place orders for services that will not cause any termination charges. Therefore, termination charge information will not be displayed to the customer.

All customers requesting a change order to existing service will be loop qualified. This is to allow a customer to both change speed and change MegaCentral in a single order. This will prevent the customer from having to order twice and will prevent the customer from being charged two separate change fees. On the order form, customers will only be asked the questions required of them to request a new speed and contract, a new ISP, and new Internet Access Package if the DSL provider is selected as the ISP. Please note that a customer who is changing speeds will also have a new DSL provider ISP USOC (if the DSL provider is the ISP) even if they do not change packages.

For changes to existing service, MegaWOT will display to the customer the new price of their MegaBit package. This will include the recurring charge for the MegaBit Service they selected, the installation and recurring charge of the DSL provider's ISP service (if they choose to change to that ISP), and the change fee associated with making a change to their MegaBit Service. If the customer selected to keep existing speed on the order form, then the final pricing displayed will include the existing recurring charge for the customer's MegaBit Service in addition to the change fee and ISP charge if any. If the customer selected a new speed but elected to keep the same service with the DSL provider's ISP (for example, USWEST.net), then the new USWEST.net recurring charge will be displayed in addition to the change fee and new recurring MegaBit Service speed charge.

Business Rules (in the MegaWOT implementation)

1. MegaWOT will authenticate customers prior to ordering or changing any service.
2. All customers will be loop qualified before placing change orders.
3. Customers will be allowed to place orders for speed changes and MegaCentral changes on the same order.
4. For customers who are changing existing MegaBit Service, MegaWOT will need to validate that the customer does currently receive MegaBit service and what speed and contract term is on the line.
5. If a customer is under contract for MegaBit service (i.e. has a 1,3, or 5 year contract for MegaBit service), the customer will be allowed to increase the MegaBit speed of the service they receive. When this customer selects a new speed, the customer may also select a contract term equal to or greater than their existing contract term.
6. The customer will be allowed to either increase or decrease the speed of the service they receive. When this customer selects a new speed, the customer may also select a contract term for this service.
7. If a customer does not have the DSL provider's ISP service and is changing to that ISP service, the customer will also be asked to select an Internet Access package.
8. If the customer is changing speeds and has the DSL provider's ISP as an access package, the USOC and recurring price of service will change. The new recurring charge will need to be explained and displayed in the pricing table. The new USOC will also need to be sent to the Notes database Exemplary Flow of Events 1. Customer enters on the Welcome page.
2. Customer selects whether he would like to place an order for new MegaBit Service or change existing MegaBit Service (welcome page).
3. Customer selects to change existing MegaBit Service.
4. Customer enters authentication information. Please note that the customer should be asked to input the telephone number of the line that they want to change (default page).
5. MegaWOT performs Class of Service compatibility check.
6. If successful, MegaWOT authenticates customer.
7. If authentication successful, MegaWOT verifies that the customer has existing MegaBit service.
8. If customer has existing MegaBit Service, MegaWOT determines speed, contract term, ISP if (for example) USWEST.net, Internet Access Package if (for example) USWEST.net.
9. If customer has existing MegaBit Service, MegaWOT performs loop qualification.
10. If loop qualification returns a positive response, MegaWOT generates a list of allowed speed and contract options.
11. If loop qualification returns a positive, MegaWOT creates list of available MegaCentrals.
12. MegaWOT loads order form and displays it to the customer. The order form includes the following:
    a. Display name and address information.
    b. Display information about customer's existing speed and contract term.
    c. Display table of allowable speed changes (this should not include the customer's existing speed).
    d. Customer selects to keep existing MegaBit service (e.g. make no change to speed).
    e. Customer selects new speed.
    f. Customer selects new contract term.
    g. Customer selects to keep existing MegaCentral (e.g. make no changes to MegaCentral values).
    h. Customer selects new MegaCentral.
    i. Customer selects new Internet Access Package (if customer is choosing USWEST.net (for example) for the first time).
    j. Customer enters contact information (name, telephone number, hours of availability).
    k. Customer selects continue to review order information.
13. MegaWOT checks order for correctness and completeness.
14. MegaWOT calculates final user pricing (There is no need to calculate promotional pricing in a suitable implementation because promo prices apply to new services).
15. MegaWOT displays order information and final user pricing to the customer.
    a. Information is displayed as either "Retain existing" or the name of the new speed and contract term or MegaCentral.
    b. MegaWOT should calculate final user pricing which will include recurring monthly charge for speed, non-recurring and recurring charge associated with a MegaCentral if the customer is changing to (DSL provider's ISP, for example) USWEST.net, and the change fee associated with changing MegaBit service.
    c. MegaWOT should include text stating that it cannot calculate pricing for ISPs other than (in the example) USWEST.net.
    d. Customer selects continue to submit the order.
16. MegaWOT submits order.
17. MegaWOT displays order confirmation page.
18. Order sent to Notes in the new Ready to Type—Change Service queue.

Exemplary Secondary Flow of Events

A. BOSS/CARS down; Loop Tool down (or Indeterminate).
1. Perform Class of Service Incompatible check.
2. MegaWOT returns BOSS/CARS down result (not displayed to customer).
3. Perform loop qual.
4. MegaWOT returns Loop Tool down result.
5. MegaWOT displays message to customer indicating that we cannot verify their customer service record nor can we confirm which speeds they can change to; allow them to choose to continue (checking page).
6. MegaWOT displays order form.
    a. Name and address information will be blank.
    b. The speed table will include all possible speeds and contract terms.

c. MegaWOT does not display existing account information.
 d. Customer chooses to keep existing speed.
 e. OR Customer selects new speed and Contract term.
 f. Customer chooses to keep existing MegaCentral.
 g. OR Customer selects new MegaCentral.
 h. If customer selects (exemplary DSL provider's ISP) USWEST.net, customer selects an Internet Access Package.
 i. Customer inputs contact information.
7. Display order review information and final user pricing same as above case.
8. Customer submits order same as above case.
9. Order goes to Session table for processing in batch update.
10. Once processed through batch update, order is sent to the Needs Customer Contact—Change Service queue.
B. BOSS/CARS up; Loop Tool down (or Indeterminate)
1. MegaWOT performs COS incompatible check.
2. MegaWOT performs authentication.
3. If authentication successful, MegaWOT verifies that the customer has existing MegaBit service.
4. If customer has existing MegaBit Service, MegaWOT determines speed, contract term, ISP if (for the example) USWEST.net, Internet Access Package if (for example) USWEST.net.
5. If customer has existing MegaBit Service, MegaWOT performs loop qualification.
6. MegaWOT returns Loop Tool down result (not displayed to customer).
7. MegaWOT displays message to customer indicating that we cannot determine which speeds a customer qualifies for; Allow them to continue (checking page).
8. MegaWOT displays order form.
 a. Name and address information will be included.
 b. The speed table will include all possible speeds and contract terms minus those speeds and contract terms that a customer does not qualify for based on their existing speed and contract term.
 c. MegaWOT displays existing account information.
 d. Customer chooses to keep existing speed.
 e. OR Customer selects new speed and Contract term.
 f. Customer chooses to keep existing MegaCentral.
 g. OR Customer selects new MegaCentral.
 h. If customer selects USWEST.net, customer selects an Internet Access Package.
 i. Customer inputs contact information.
9. Display order review information and final user pricing same as above case.
10. Customer submits order same as above case.
11. If Loop Tool Down, Order goes to Session table for processing in batch update.
12. Once processed through batch update, order is sent to the Needs Customer Contact—Change Service queue.
13. If Indeterminate, order is written to log table but put in Needs Customer Contact—Change Service queue.
C. BOSS/CARS down, Loop Tool up
1. Perform Class of Service Incompatible check.
2. MegaWOT returns BOSS/CARS down result (not displayed to customer).
3. Perform loop qual.
4. Loop qual tool returns available speeds.
5. MegaWOT displays message to customer indicating that we cannot verify their customer service record; Allow them to choose to continue (checking page).
 6. MegaWOT displays order form.
 a. Name and address information will be blank.
 b. The speed table will include all speeds and contract terms returned by loop qual.
 c. MegaWOT does not display existing account information
 d. Customer chooses to keep existing speed.
 e. OR Customer selects new speed and Contract term.
 f. Customer chooses to keep existing MegaCentral.
 g. OR Customer selects new MegaCentral.
 h. If customer selects USWEST.net, customer selects an Internet Access Package.
 i. Customer inputs contact information.
7. Display order review information and final user pricing same as above case.
8. Customer submits order same as above case.
Batch Update Qualification Order
 1. Perform Class of Service Compatibility check.
 2. Perform Authentication routine.
 3. Check for existing MegaBit service.
 4. Calculate speed, contract term, ISP.
 5. Check chosen speed/contract term to see if it is an allowable change.
 6. Check ISP to determine that if the customer previously had (in the example) USWEST.net, they have not specified (in the example) USWEST.net and just picked a new package.
 7. Batch update does not need to calculate Promotional Pricing for Change Orders.
 8. If customer passes all of the above checks, submit order.
 9. Once processed through batch update, order is sent to the Needs Customer Contact—Change Service queue.
 10. Three possible points of failure in batch update:
 a. If customer fails authentication, send e-mail.
 b. If customer does not have MegaBit, send to Failed to Qualify—Needs Callback.
 c. If customer has chosen a speed, contract term, or MegaCentral change that is not allowable, send to Needs Customer Contact—Other.
Additional MegaWOT and Notes Details (for a Preferred Implementation)

| Page | Case | Description |
| --- | --- | --- |
| Welcome.asp | All | Text explaining the multiple functions of the MegaWOT tool. |
| Welcome.asp | All | Question asking what type of order would you like to place: New MegaBit Service, Change Existing MegaBit Service, Check MegaBit Service Availability |
| Default.asp | Change Existing MegaBit Service | Please enter the telephone line that currently receives MegaBit Service: |
| Qualification Routine | Change Existing MegaBit Service | Disable Class of Service check |
| Qualification Routine | Change Existing MegaBit Service | Disable Feature Check |
| Qualification Routine | Change Existing MegaBit | Perform check for existing MegaBit service. Instead of checking the list of line features against the Feature table, check the list of |

-continued

| Page | Case | Description |
|---|---|---|
| | Service | line features against the MegaBit package table. In order to successfully qualify to complete a change existing service order, one of the line features on the selected line should match one of the USOCs in the "USOC" column of the MegaBit Package table. |
| Qualification Routine | Change Existing MegaBit Service | If MegaBit Package USOC is found, translate USOC into speed and contract term using the "Speed" and "Contract Term" fields in the MegaBit Package table. If no MegaBit Package USOC is found, end process and display failure message. |
| Qualification Routine | Change Existing MegaBit Service | If MegaBit Package USOC is found, identify existing ISP. Compare the list of line USOCs against the "Host Name" field in the MegaCentral table. If there is a match, MegaWOT should translate the Host Name into the correct ISP name from the "ISP Name" field in the Megacentral table. |
| Qualification Routine | Change Existing MegaBit Service | If MegaBit Package USOC is found, perform loop qualification. Success cases include: SUCCESS_QUALIFIES_MLT, SUCCESS_QUALIFIES, LOOP_NO_CAPACITY_FOR_YOU, LOOP_NEED_MLT, LOOP_INDETERMINATE_PREMIS or LOOP_INDETERMINATE_LFACS. If the loop qual tool returns another response, the order should return an error message. |
| Qualification Routine | Change Existing MegaBit Service | Based on results of loop qual, determine eligible changes to the customer's speed. If none are available, store information and display "No available speed changes" instead of the speed change table. |
| OrderForm.asp | Change Existing MegaBit Service | Display name, address, existing MegaBit speed, existing MegaBit contract term, ISP, table of allowable speed/contract changes. Customer selects if they want to keep their existing speed. Customer selects new speed (pre-populated with allowable speed changes) and contract term (pre-populated with allowable contract changes). Customer selects if they want to keep existing MegaCentral. Customer selects new MegaCentral (from list of available MegaCentrals minus current MegaCentral). If customer selects (in the example) USWEST.net, customer picks Internet Access Package. If customer changes speed and has (for example) USWEST.net MegaWOT will need to calculate the new recurring charge and the new USOC for Internet Access Customer inputs contact name, contact TN, available times. |
| OrderForm.asp | Change Existing MegaBit Service | Help links will be needed to explain allowable speed changes, contract changes, and MegaCentral changes. |
| ConfirmOrder.asp | Change Existing MegaBit Service | Perform the following checks: Customer has input contact info. Customer has either selected new speed and contract term OR specified that they are keeping the existing. Customer has either selected new MegaCentral or selected to keep the existing MegaCentral. If customer selects USWEST.net, he also selected an Internet Access Package. If customer fails any of these checks, he should be allowed to return to the order page to correct the mistakes. |
| Confirmorder.asp | Change Existing MegaBit Service | Display final user pricing. Text to indicate that customer should contact MegaCentral to determine pricing information. |
| OrderDone.asp | Change Speed AND Change MegaCentral | Text to indicate approximate length of time orders take to fulfill. |
| DslHelp.asp | New Link to Contract Term | Help to indicate why customers with contract terms cannot reduce speed. |
| DslHelp.asp | New Link to pricing information | Help section to explain non-recurring charge. |
| DslHelp.asp | New Link to MegaCentral contact information | Help section to explain the process of disconnecting from one MegaCentral and connecting to another. |
| Notes | New queues | Queues for Change Service: Ready to Type -Change Service (which should be subdivided by region), Needs Customer Contact-Change Service (which should be subdivided by region) |
| Notes | Batch Update Failure | Customer does not have existing MegaBit Service. This needs to be a failure code that is passed to the CSRs who are doing callbacks. Orders should go into the Failed to Qualify-Needs Callback queue |
| Notes | Batch Update Failure | Customer has contract and tries to reduce speed or select new contract term. This needs to be a new failure code that is passed to the CSRs who are doing callbacks. Orders should go into the Needs Customer Contact-Other |
| Notes | Batch Update Failure | Customer selects MegaCentral or Speed that they already have. This needs to be a failure code that is passed to the CSRs who are doing callbacks. Orders should go into the Needs Customer Contact-Other |

Implement Web Reporting Capability

Using MegaWOT, the ability exists to run canned reports through, for example, Microsoft Access on the desktop and ad hoc reports using, for example, Cognos Impromptu, when installed on a user's desktop. Furthermore, MegaWOT allows authorized users to view canned reports through a web interface. This tool involves publishing existing canned reports to the DSL provider Intranet. From here, approved users have a defined user name and password for accessing this tool. Unapproved users will not have user names and passwords and will therefore not be able to view the page nor choose reports.

Exemplary Flow of Events
1. Define the appropriate URL
2. Create the web pages that link to the canned reports in the database.
3. Implement security procedures (including named users and authentication steps).
4. Define authorized users and establish security for these users.
5. Authorized user accesses URL.
6. User inputs required security information.
7. User is presented with a list of canned reports from which to select.

8. User selects the desired report, the report is generated, and the report information appears on the screen within the browser.

Implement Database Table Maintenance Procedures

There are numerous "configuration" tables used by MegaWOT to populate package, MegaCentral, pricing, USOC information, etc. These tables will be maintained on an on-going basis. The maintenance of some of these tables will be automated and some will be manually maintained.

Tables that will have automated updating from USWEST databases implemented:
1. MegaCentral
2. Central Office Tables that will be maintained using the Pricing Maintenance Tool include:
1. Promo
2. Promo Pricing
3. Promo Item
4. Promo Temp Tables that will be manually maintained through an MS Access interface:
1. Authentication Attempt
2. Pricing
3. MegaBit Package
4. Internet Access
5. Class of Service
6. Features
7. Modem Tables that are updated by MegaWOT with MegaWOT activity:
1. Batch E-mail
2. Customer Session
3. Customer Log Limit Maximum Authentication Attempts MegaWOT should limit the number of authentication attempts for a given BTN within one day to a maximum of 5 failed attempts. One day is defined by one midnight to midnight interval on the system clock. This information needs to be logged and stored in a new table.

Exemplary Flow of Events
A. BOSS/CARS Up
1. User inputs authentication information and selects continue.
2. MegaWOT performs authentication routine.
3. The CSR belonging to the telephone number the customer entered is located but the SSN or Account Code does not match.
4. MegaWOT returns a message to the customer indicating that their customer service record could not be verified and asks them to try again to input the new information.
5. Customer's BTN and datetime is logged.
6. Customer can attempt to log in unsuccessfully 5 times within a single 24 hour day.
7. On the fifth failed attempt, MegaWOT should return a message indicating that their account has been locked for their safety for a 24 hour period.

Exemplary Secondary Flow of Events
B. BOSS/CARS Down
1. User inputs authentication information and selects continue.
2. MegaWOT performs authentication routine.
3. MegaWOT returns BOSS/CARS down case.
4. Customer completes order.
5. Order is sent to Customer Session for processing in batch update.
6. This process is repeated numerous times while systems are down, each using a different customer code.
7. Systems come back on line.
8. Batch update begins.
9. Each incorrect authentication attempt is logged.
10. At the fifth unsuccessful authentication attempt, the customer will receive an e-mail stating that their CSR could not be located.
11. Each subsequent attempt should receive the same e-mail regardless of whether or not the authentication information input is correct or not.

Effective Dates

MegaWOT allows "post dating" of data elements in the configuration database. For each table where effective dates will be implemented, there will need to be two fields added to each entry in the table. This first is the effective date. The second is the completion or end effective date. If no end effective date is present, MegaWOT will assume the record to be current and valid. Begin and end effective dates may be assumed to begin at 12:00 am (midnight) and end just before 12:00 am (midnight). Old records should not be deleted.

The default values for begin effective date are the date the record is added to the table. The default value for end effective date is null. Each operation performed by MegaWOT that accesses the configuration tables with effective dates will need to be modified to handle begin and end effective dates.

Exemplary Flow of Events
1. MegaWOT operation accesses database configuration table.
2. MegaWOT checks for current date within begin and end effective date period.
3. If yes, MegaWOT uses record.
4. If no, MegaWOT ignores record.

Input/Output Tables

The following tables should implement the begin and end effective dates:
1. Modem
2. MegaBit Package
3. Internet Access
4. Promo
5. Pricing The following tables should not implement the begin and end effective dates:
1. Customer Session Table
2. Customer Log
3. Batch E-Mail
4. Central Office
5. MegaCentral
6. Authentication Attempt
7. Class of Service
8. Features
9. Promo Pricing
10. Promo Item
11. Promo Temp Referring now to FIG. 1, network architecture suitable for use with embodiments of the present invention is generally indicated at 10. The subscribers, or spokes, may reach the network in a variety of ways. For example, a computer 12 may have an internal peripheral component interconnect (PCI) card 14 used for DSL access. Computer 12 is connected to plain old telephone system (POTS) splitter 16, which in turn, connects to the public switch telephone network (PSTN) 18. At the other output of POTS splitter 16, a digital subscriber line access multiplexer 20 multiplexes a plurality of DSL services and provides communication with data network 22.

As mentioned above, the spokes may access the network in a variety of ways with the internal PCI board DSL modem being one such technique. In another example, a computer 30 may have an internal Ethernet card and an external DSL modem 32. In another example, an Ethernet local area network (LAN) may use an external DSL modem 36 to reach the POTS splitter 16. Of course, if the loop is used for DSL only (and not POTS service), the line may connect directly to the DSLAM. As computers 12 and 30 and network 34 are at the end of spokes of the network, an Internet service provider 40 and a corporate local area network (LAN) 50 are examples of hubs connected to data network 22. As shown, the ISP 40 connects to network 22 and utilizes routers 42 and 44 to grant access to Internet 46. On the other hand, corporate LAN 50 is shown with a router 52 and an Ethernet network 54. Of course, hubs and spokes may be configured in a variety of different ways, with the central differentiation between a hub and a spoke being the bandwidth and physical location on the network. That is, spokes go through hubs to reach the rest of the Internet.

Figure 2:
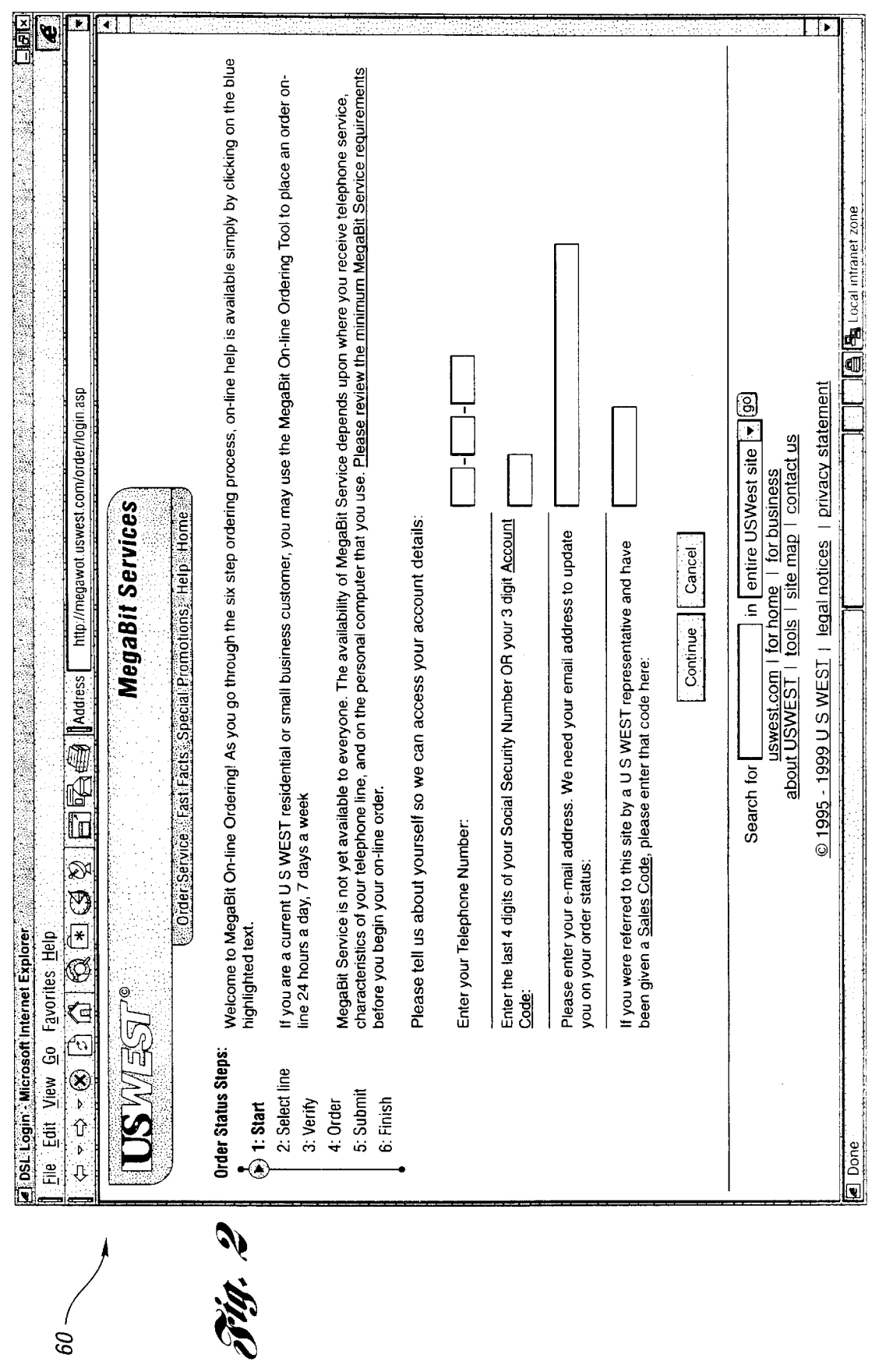

In FIG. 2, a user login/authentication (exemplary) screen is illustrated within a browser window, generally indicated at 60. In the example, the users are prompted to enter their telephone number and partial social security number or account code for authentication purposes. Email addresses are used to update users on their order status. Sales codes are collected for marketing and sales compensation purposes.

Figure 3:
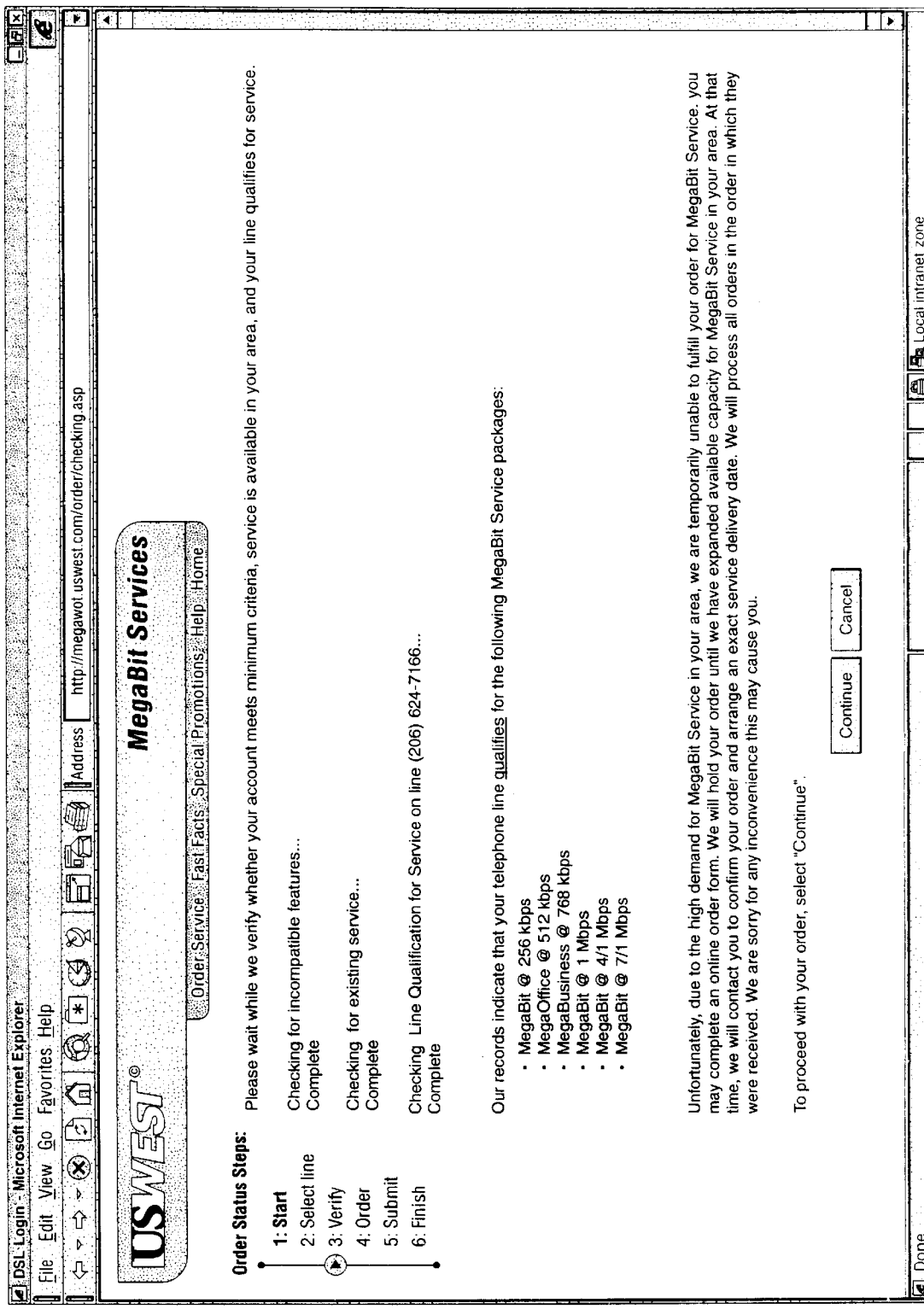
FIG. 3 is another screen shot from the session.

In FIG. 3, the loop of qualifications screen example is generally indicated at 70. A user's line is tested to ensure it that qualifies for DSL service, for example, an asymmetric digital subscriber line (ADSL) service. The screen displays all of the ADSL (or the DSL) service packages that the user's line qualifies for. Text informs the user of any additional information regarding their line. In FIG. 4, generally indicated 80, is an order form. All applicable speed and contract terms are preferably shown, with their associated prices. Selection is made, and business rules ensure that only allowable choices are offered.

Figure 5:
FIG. 5 is yet another screen shot from the session.

In FIG. 5, additional parts of the order form are generally indicated at 90. Internet service provider (ISP) choices are made and an ISP is selected from a list of available ISP's in the customer's specific service area. As appropriate, specific questions are asked regarding the customer's computer.

Figure 7:
FIG. 7 is another screen shot from the session.

In FIG. 6, generally indicated at 100, additional parts of the order form are illustrated. A preferred form preferably inquires as to the number of wall/desk jacks to ensure the correct number of microfilter packages are sent. Further, the customer is further given an option as to the type of installation, that is, self or technician installation. Still further, a preferred order form includes some marketing questions to help the provider target new customers. In FIG. 7, at 110, the final pricing page depicts actual one-time and monthly charges, including individual discounts and promotions.

Figure 8:
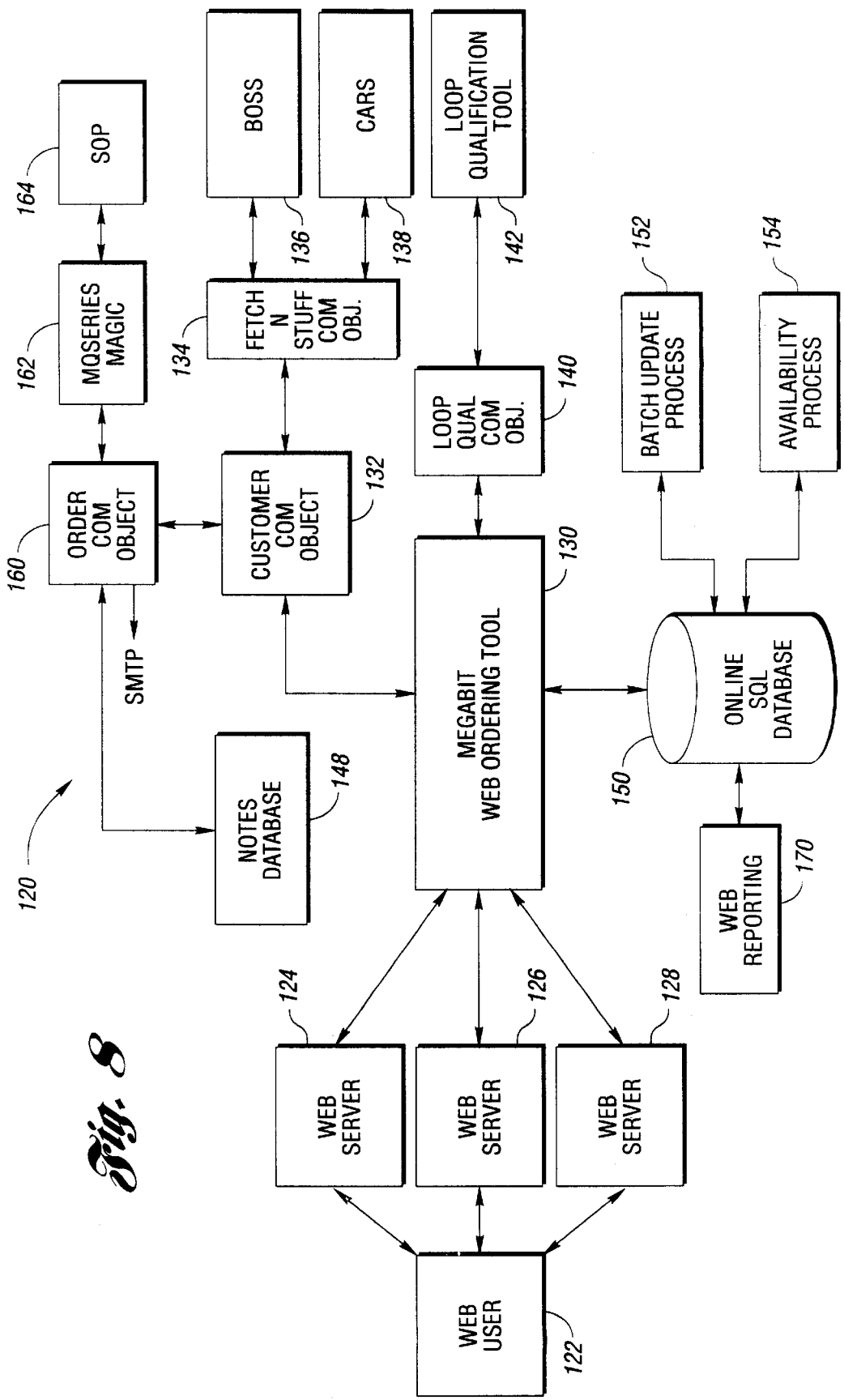
FIG. 8 is a functional block diagram of the present invention.

In FIG. 8, logical architecture is generally indicated at 120. On the web, user 122, has accessed to any one of web servers 124, 126, 128. The web servers are in communication with a web ordering tool 130 of the present invention. Web ordering tool 130, for the very first time, is able to initiate a session that both qualifies the loop and places the service order for obtaining a DSL solution. Loop qualification tool 142 is accessed through loop qualification logic 140 during the session with web ordering tool 130. As needed, and to place the order, appropriate logic allows access to legacy systems. A billing and order support system (BOSS) 136 and a customer access and retrieval system (CARS) 138 are accessible through logical communications objects 132 and 134. Further, logical blocks 160 and 162 allows access to a service order processor 164 which may also be a legacy system in some embodiments. And further, the notes database 148 is also accessible to the web ordering tool. That is, all of the various systems described previously herein are accessible to the web ordering tool in the preferred embodiments of the present invention. Further, database 150 batch update process 152, and availability process 154, in addition to web reporting block 170 are all in logic communication with web ordering tool 130.

Figure 9:
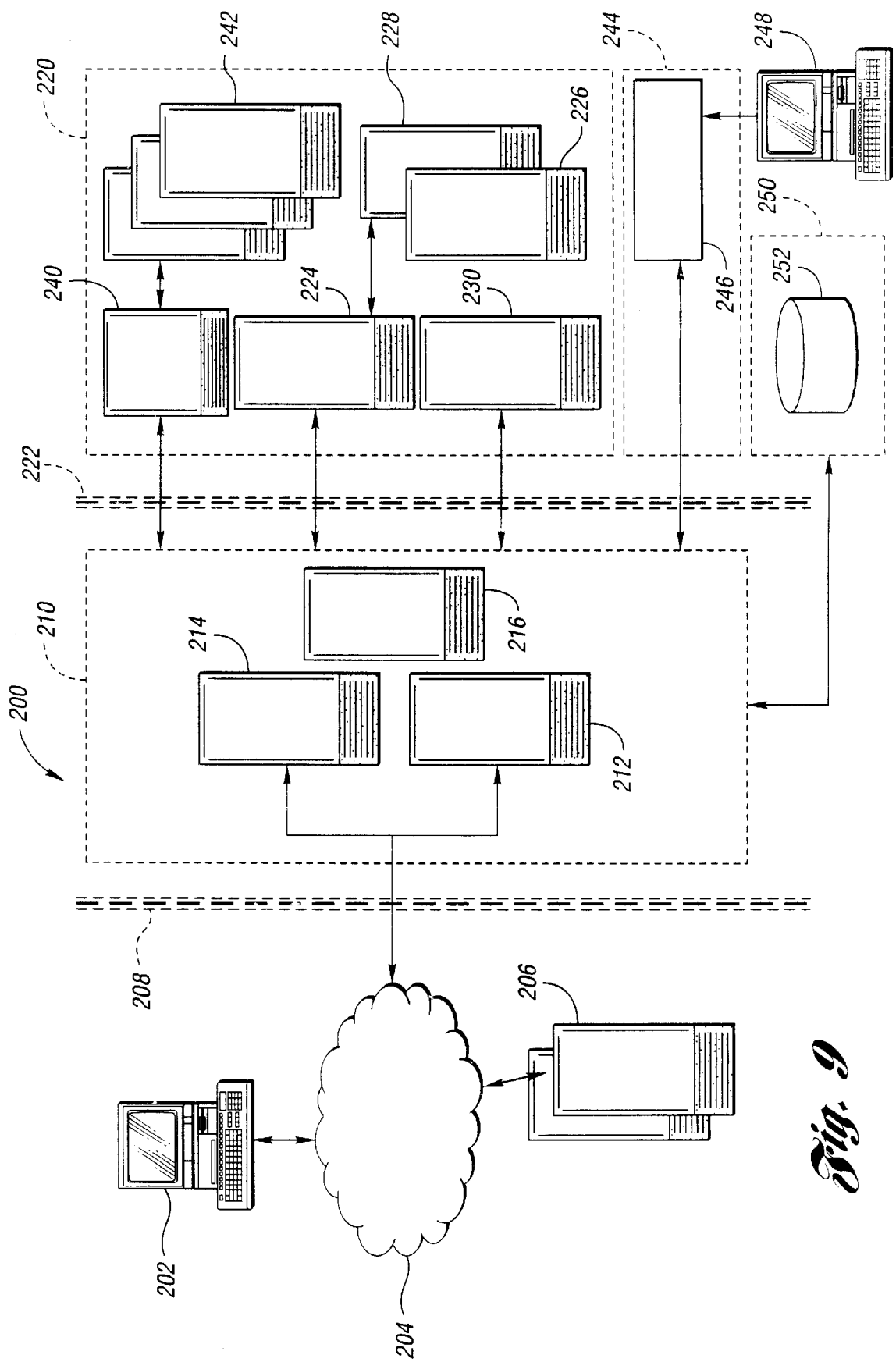
FIG. 9 is a system block diagram of the present invention.

In FIG. 9, an exemplary implementation of the physical architecture is generally indicated at 200. A computer 202 preferably runs a cookie-enabled web browser. Computer 202 is on the Internet 204, as are web servers 206. The web ordering tool servers 210, including servers 212, 214, 216, are on Internet 204 behind firewall 208. Additional systems 202 and database 250 are behind another firewall 222. That is, systems 220 are servers and mainframes, including service order processor 242 accessed through the intermediate server 240. Further, CARS 228 and BOSS 226 are accessible through a intermediate server 228 and loop qualification tools are at server 230. Notes 246 are contained within note server 244, and a log database 252 at block 250 is also accessible to the web ordering tool servers 210. In addition, an order writer 248 is in communication with notes 244.

Figure 10:
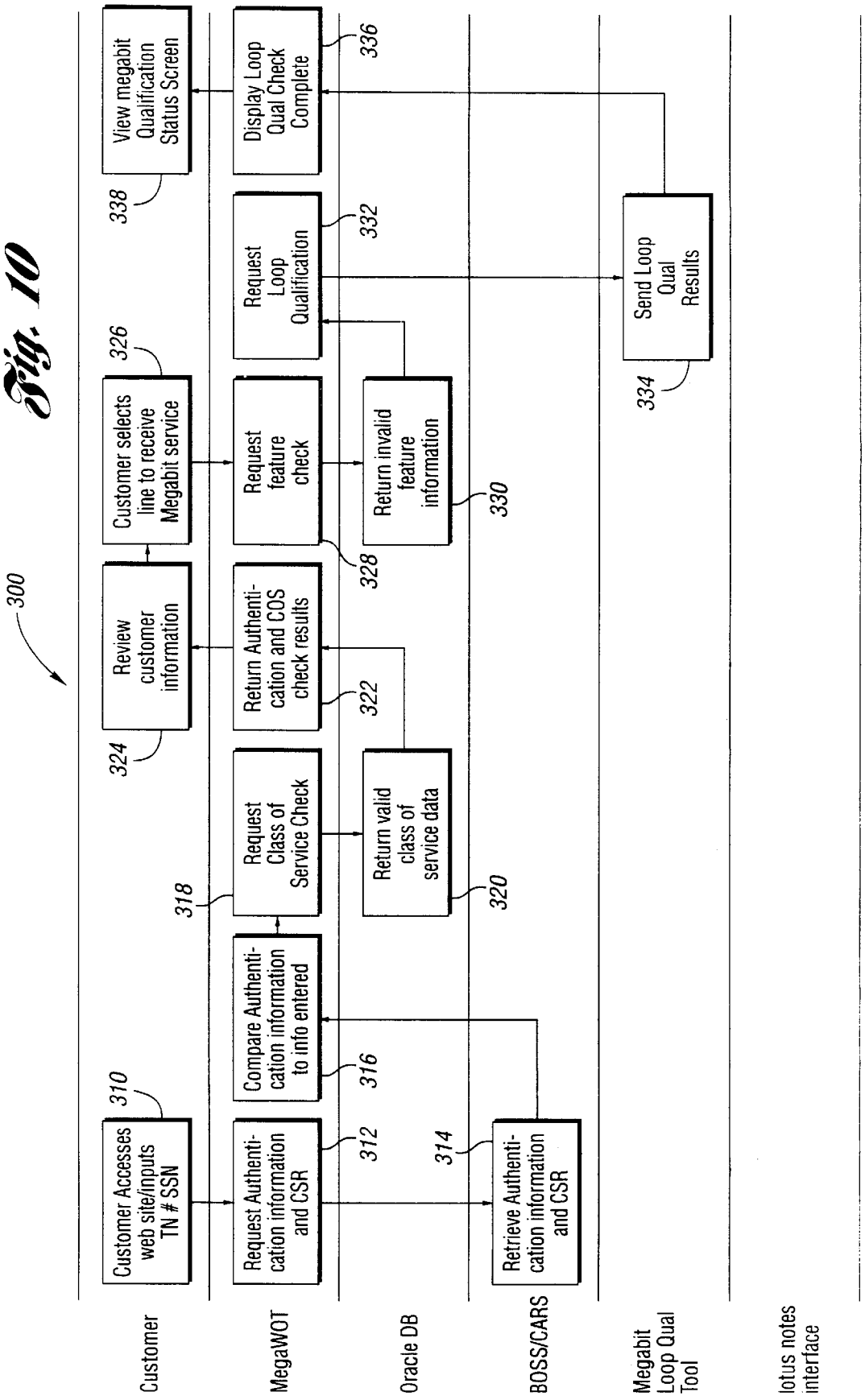
FIG. 10 is a web ordering tool process flow diagram.
Figure 11:
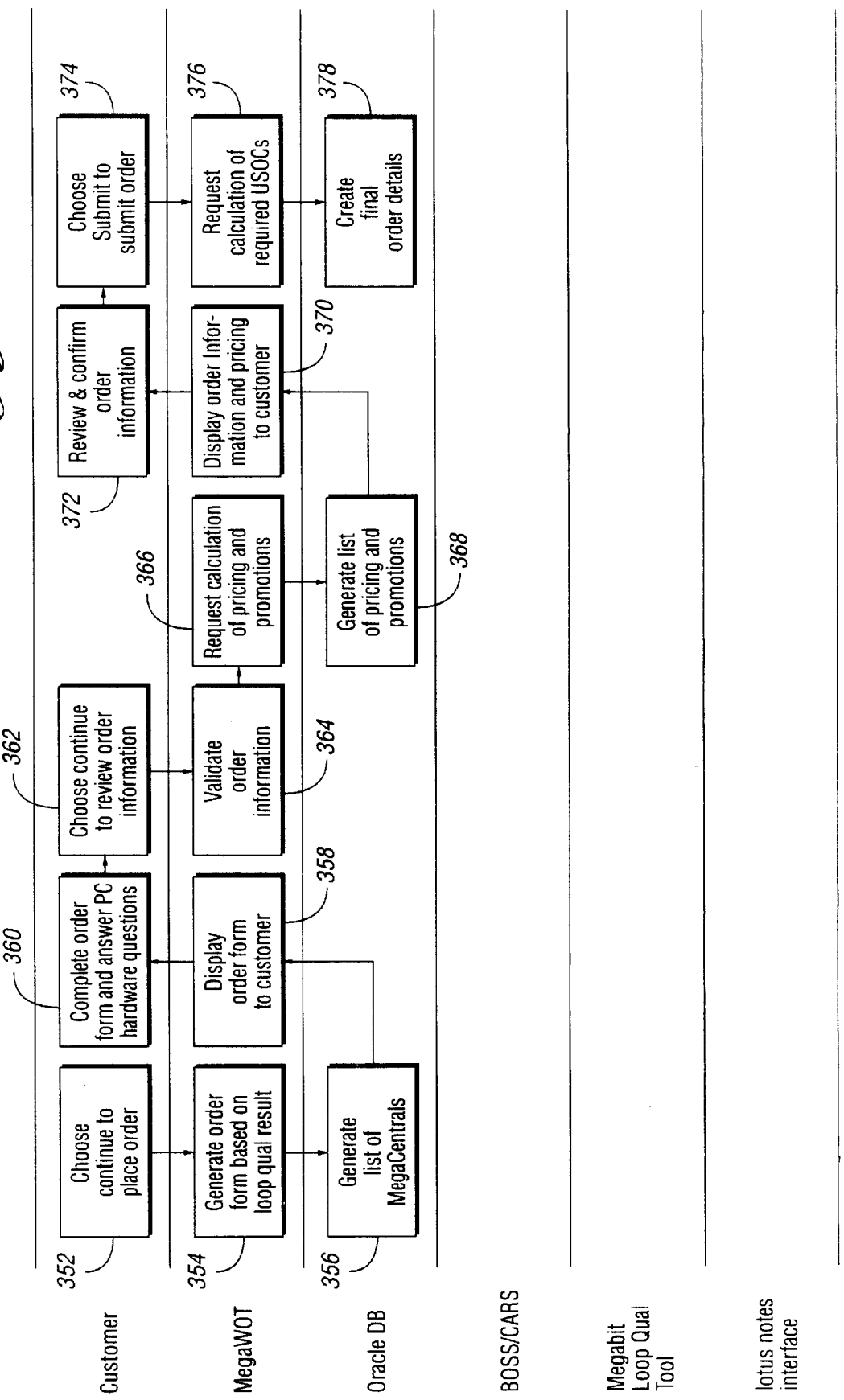
FIG. 11 is a web ordering tool process flow diagram.

Referring to FIGS. 10–12, an exemplary web ordering tool process flow is illustrated. At blocks 310, 312, 314, and 316, the customer accesses the ordering tool and is authenticated as described previously. At blocks 318, 320, and 322, a class of service check is performed (when possible). That is, class of service may be, for example, business or residential. At block 324, the customer is allowed to review the information. At block 326, a line is selected. At block 328 and 330, a featured compatibility check is performed as described previously. And, at blocks 332, 334, and 336 a loop qualification is requested, performed, and results are sent back to the ordering tool. At block 338, the customer is given the opportunity to view the loop qualification status.

At block 352, if desired, the customer may choose to continue to place the order. At blocks 354, 356, and 358, the order form is generated and the customer chooses their hub. At blocks 360, 362, and 364, additional details such as hardware configuration and validation are taken care of. At blocks 366, 368, and 370, pricing and promotional aspects of the order are handled as described previously herein. At blocks 372 and 374, the order may be reviewed and confirmed, and then submitted. At block 376, the web ordering tool determines the needed features or universal service offering codes (USOC), and final order details are created at block 378.

In FIG. 12, at block 402, 404, 406, and 408, information is logged and order details are sent out for processing. The notes interface receives the order details at 410, and parses the details into queues at block 412. The queues are later processed by appropriate systems.

Figure 13:
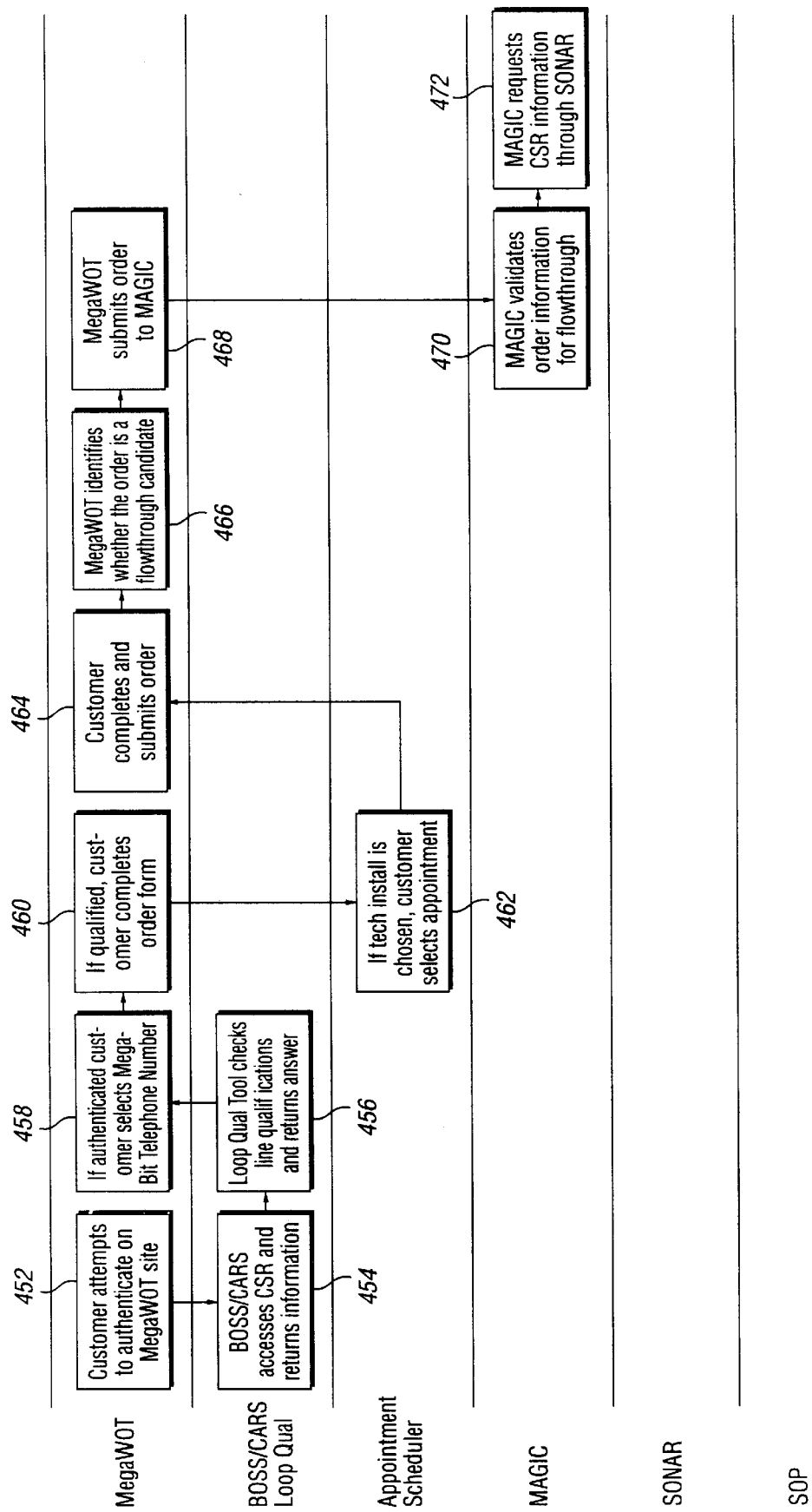
FIG. 13 is a flow through process flow diagram.

In FIGS. 13 and 14, and exemplary web ordering tool flow through process flow is illustrated. In a flow through process, the web ordering tool of the present invention controls process flow all the way through implementation of the order. In blocks 452, 454, 456, and 458, authentication and loop quality testing occur. At block 460, a qualified customer is able to complete the order form. At block 462, optionally, the customer is able to schedule a visit from a technician. At blocks 464 and 466, the order is completed, submitted, and the web ordering tool identifies whether the order is a flow through candidate.

At block 468, the ordering tool submits the order to intermediate logic present between the ordering tool and service order processor. At block 470, the intermediate logic validates the order information for flow through processing. At block 472, the intermediate logic requests customer service record information through a service order negotiation and retrieval (SONAR). At blocks 502, 504, 506, and 508 information is processed and the order is submitted to the service order processor (SOP). At block 510, the SOP accepts the order and validates information. At block 512, the SOP sends acknowledgment to SONAR of success/failure. At blocks 514, 516, and 518, the results status is passed all the way back to the web ordering tool. At block 520, the web ordering tool associates order numbers with all successes. At block 522, the web ordering tool submits service order processor errors and rejects to notes. At block 524, order writers correct entered SOP orders and input rejected SOP orders.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for providing a digital subscriber line service for a loop, the method comprising:

initiating a session, through a web server, with a web-based digital subscriber line service ordering tool;

conducting a loop qualification test upon a request from the ordering tool; and placing a service order for the digital subscriber line service for the loop, the order being placed by the ordering tool and in accordance with the loop qualification test.

2. The method of claim 1 further comprising:

establishing a set of promotions applicable to service orders.

3. The method of claim 2 further comprising:

determining any promotions from the set of promotions that are applicable to the service order currently being placed; and applying any applicable promotions to the service order.

4. The method of claim 1 wherein the session is initiated by a customer, and wherein the method further comprises:

authenticating the customer prior to placing the service order.

5. The method of claim 4 wherein authenticating further comprises:

inputting authentication information to the ordering tool from the customer;

determining at least one customer service record corresponding to the authentication information; and when that at least one customer service record includes a single live record, performing authentication based on the single live record.

6. The method of claim 1 wherein placing the service order further comprises:

placing an order for a new service.

7. The method of claim 1 wherein placing the service order further comprises:

placing an order for changing an existing service.

8. The method of claim 1 further comprising:

establishing a list of features that are incompatible with the digital subscriber line service;

identifying a list of features for the customer loop; and performing a compatibility check by comparing the identified features with the established list of features.

9. A system for providing a digital subscriber line service for a loop, the system comprising:

a web-based digital subscriber line ordering tool in communication with a web server, the ordering tool being programmed to initiate a single session with a customer during which a loop qualification test is conducted and a service order is placed.

10. The system of claim 9 further comprising:

legacy logic configured to provide communication between the ordering tool and at least one legacy system.

11. The system of claim 10 further comprising:

a service order processor in communication with the ordering tool via the legacy logic.

12. The system of claim 10 further comprising:

a billing and order support system in communication with the ordering tool via the legacy logic.

13. The system of claim 10 further comprising:

a customer access and retrieval system in communication with the ordering tool via the legacy logic.

14. The system of claim 9 further comprising:

loop qualification logic configured to provide communication between the ordering tool and a loop qualification tool to perform the loop qualification test.

15. The system of claim 9 wherein the ordering tool is configured to place the service order as an order for a new service.

16. The system of claim 9 wherein the ordering tool is configured to place the service order as an order for changing an existing service.

17. A system for providing a digital subscriber line service for a loop, the system comprising a web-based digital subscriber line ordering tool in communication with a web server, the ordering tool being programmed to:

authenticate a customer by comparing authentication information provided by the customer to authentication information retrieved from a support system;

determining loop feature compatibility based on existing features for the local loop;

determining loop qualification based on a loop qualification test; and generating a service order.

* * * * *